Sept. 13, 1949.　　　　　　　　N. BREWER　　　　　　　　2,481,496
RATIO CONTROLLER

Filed Sept. 25, 1945　　　　　　　　　　　　　　　　5 Sheets-Sheet 4

INVENTOR.
Nathaniel Brewer
BY Leonard L. Kalish
Attorney

Sept. 13, 1949.  N. BREWER  2,481,496
RATIO CONTROLLER
Filed Sept. 25, 1945  5 Sheets-Sheet 5
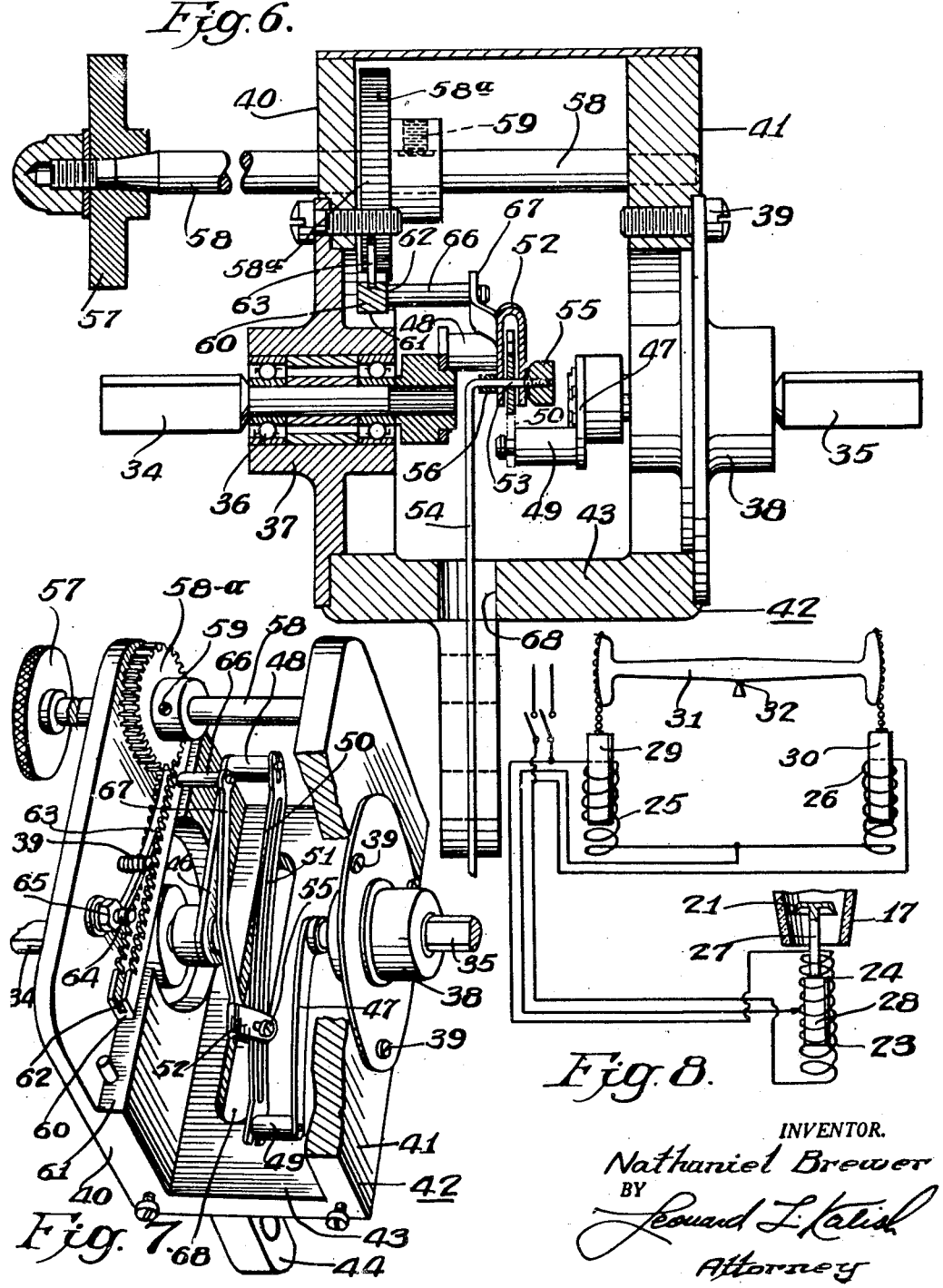
INVENTOR.
Nathaniel Brewer
BY
Leonard L. Kalish
Attorney Patented Sept. 13, 1949

2,481,496

UNITED STATES PATENT OFFICE 2,481,496

RATIO CONTROLLER

Nathaniel Brewer, Newtown, Pa., assignor to Fischer & Porter Company, Hatboro, Pa., a corporation of Pennsylvania Application September 25, 1945, Serial No. 618,540

7 Claims. (Cl. 74—1)

The present invention relates to ratio controllers or the like and it relates more particularly to mechanism for automatically maintaining predetermined ratio of flow in a plurality of fluid-lines or the like.

An object of the present invention is to provide a new and improved ratio controller. Another object of the present invention is to provide simple, compact, and accurate mechanism for controlling the ratio of fluid-flow in a plurality of pipe-lines or the like. Still another object of the present invention is to provide simple, compact, more or less unitary and accurate mechanism for effecting changes in a flow-rate which are linearly proportional to the deviations of another independently-variable flow-rate.

Other objects and advantages of the present invention are apparent in the following detailed description, appended claims and accompanying drawings.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 6 represents a vertical cross-sectional view generally along the line 6—6 of Fig. 4.

Figure 7 represents a perspective view of the proportioning link mechanism, parts being broken away better to reveal the construction thereof.

Figure 8 represents a wiring diagram of the impedance circuit intermediate one of the rotameters and its remote balanced beam.

In one embodiment of the present invention shown generally in Figures 1 to 8, I may provide mechanism for automatically controlling the ratio of rates-of-flow in two separate fluid-lines so as to maintain a constant ratio therebetween. In this embodiment, ratio control is effected by automatically changing the rate-of-flow in a secondary line 11 responsive to variations in the rate-of-flow in a primary line 10 (into which the secondary line leads as at 12) so as always to maintain a predetermined ratio of fluid-flow in the two lines regardless of variations in the rate-of-flow in the primary line 10.

Figure 1:
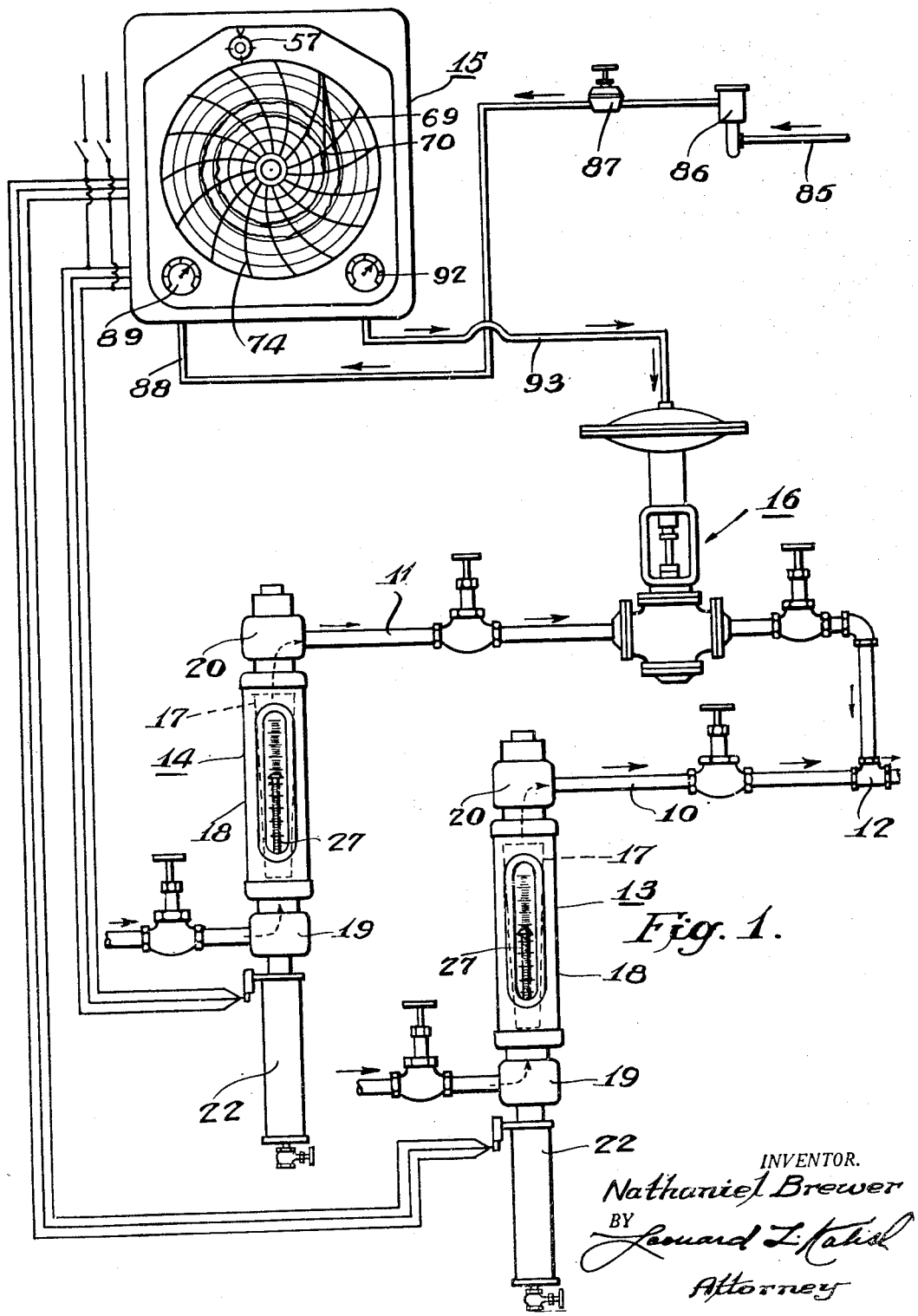
Figure 1 represents a diagrammatic view of one embodiment of the present invention.

Referring particularly to Figure 1, I prefer to effect this ratio control by inserting transmitting rotameters 13 and 14 within said lines 10 and 11 respectively and by causing said rotameters 13 and 14 conjointly to regulate a ratio controlling and recording unit indicated generally by the reference character 15, and by causing the ratio controlling and recording unit 15 in turn to regulate an automatically-controlling air-operated diaphragm motor valve 16 connected within the secondary line 11.

The rotameters 13 and 14 may be generally identical in construction (except for the fact that the rotameter 14 in the secondary line 11 may be designed for lower rates-of-flow where the secondary line 11 is smaller than the primary line 10) and each may include a downwardly-tapered vertical glass metering tube 17 disposed within a windowed housing 18 provided with independently horizontally swivelable lower and upper "heads" or fittings 19 and 20 which provide the inlet and outlet connections respectively for the rotameter.

Disposed within the metering tube 17 is the flow-constricting head 21 of a metering float; the position of the head 21 within the tube 17 being determined by the rate-of-flow of fluid upward through said tube in a manner well known in the art.

An extension chamber 22 is disposed co-axially beneath the metering tube 17 and contains the lower and upper transmitter coils 23 and 24 of an impedance circuit, shown in Figure 8 having a pair of side-by-side receiver coils 25 and 26 disposed within the remote ratio controller and recording unit 15.

An elongated connecting member 27 extends downwardly from the head 21 of the metering float and carries, at its lower end, an elongated transmitter armature disposed within the transmitter coils 23 and 24 of the impedance circuit.

Receiver armatures 29 and 30 are disposed within the receiver coils 25 and 26 and are suspended from the ends of a balanced beam 31 which is pivoted upon a central knife-edge or fulcrum-point 32.

The impedance circuit, which is more fully shown and described in my co-pending application, Serial Number 511,649, filed November 25, 1943, now Patent Number 2,414,086, issued January 14, 1947, causes the balanced beam 31 to tilt upon vertical movement of the head 21 of the metering float responsive to variations in rateof-flow through the rotameter tube 17. That is, when the rotameter float head 21 moves upward from the position shown in Figure 5, the beam 31 will tilt counter-clockwise from the position shown in Figure 5. Conversely, downward movement of the rotameter float head 21 will result in a clockwise tilting of the beam 31.

The impedance circuit leading from the primary line rotameter 13 is adapted to actuate the primary balanced beam hereinafter designated as 31—p, while the impedance circuit leading from the secondary line rotameter 14 is adapted to actuate the balanced beam hereinafter designated as 31—s.

The beams 31—p and 31—s are compactly mounted in a manner to be hereinafter described in detail, back-to-back upon a central partition wall 33 hingedly disposed within the housing of the unit 15, to provide ready access to both beams.

Beams 31—p and 31—s are carried respectively by front and rear shafts 34 and 35. The shafts 34 and 35 are rotatably mounted upon ball-bearings 36 disposed within front and rear journal-boxes 37 and 38 which are detachably connected by means of bolts 39 to the front and rear walls 40 and 41 of the generally U-shaped frame 42 of a proportioning link assembly; the bottom wall 43 of said frame 42 being provided with a pair of downwardly-extending lugs 44. Bolts 45 connect the lugs 44 to the partition wall 33 and serve to support the frame 42 upon said wall 33.

Generally horizontal oppositely-extending bell-cranks 46 and 47 are mounted upon the inner ends of the shafts 34 and 35 respectively within the frame 42.

The other ends of the bell-cranks 46 and 47 are pivotally connected, as at 48 and 49, respectively to the opposite ends of a proportioning link 50 which is provided with a slot 51.

The yoke 52 is slidably fitted about the link 50 and is fastened thereto by the upper horizontal end 53 of a connecting arm 54 whose function will be hereinafter described. The upper end 53 passes through the slot 51 of the link 50 and also passes through aligned openings in the yoke 52. A fastening nut 55 is screw-threadedly mounted upon the free end of the portion 53 while a shoulder 56 is fixedly mounted adjacent the other end of said portion 53 so that tightening of the nut 55 will lock the yoke 52 to the portion 53.

Means are provided for moving the yoke 52 relative to the link 50 and include an adjusting knob 57 disposed on the front of the unit 15 and mounted upon the front end of a shaft 58 whose inner end is journalled within the front and rear walls 40 and 41 of the frame 42.

A spur-gear 58—a is locked upon the shaft 58 adjacent the inner side of the front wall 40 by means of a set screw 59. The spur gear 58—a meshes with a generally horizontal rack 60 which is slidably mounted upon a shoulder 61 formed integrally with the inner side of the front wall 40.

The rack 60 is provided with a central axially-extending channel 62 into which the free end of a spring bar 63 extends. The other end of the spring bar 63 is looped about a bolt 64 passing through the wall 40 and is held in place by a nut 65 screw-threadedly mounted on the bolt 64. The spring bar 63 passes underneath the inner end of the uppermost bolt 39 bolting the front journal box 37 to the front wall 40 and is thereby tensioned so that its free end maintains a downward pressure upon the channel 62. This frictionally retains the rack 60 in any position to which it is moved by rotation of the knob 57 and the gear 58—a and prevents free accidental shifting of said rack 60.

A spacer pin 66 extends rearwardly from the rack 60 and pivotally connects with one end of an adjusting rod 67 leading to the yoke 52.

It is apparent that rotation of the knob 57 will cause rotation of the spur-gear 58—a and movement of the rack 60 and the rod 67 which, in turn, causes movement of the yoke 52 relative to the link 50. As the yoke 52 is thus moved relative to the link 50, the upper end 53 of the connecting arm 54 is moved with it.

The connecting arm 54 extends downwardly through an elongated opening 68 formed in the bottom wall 43 of the frame 42 as shown particularly in Figure 6.

A pair of pen arms 69 and 70 are loosely pivoted upon a common shaft 71. Linkage 72 connects the pen arm 69 to the beam 31—p whereby tilting of the beam will cause swinging of the pen arm 69 about the shaft 71. Linkage 73 similarly connects the pen arm 70 to the beam 31—s whereby tilting of said beam 31—s causes swinging of the pen arm 70 about the shaft 71.

The movements of the pen arms 69 and 70 are recorded upon a chart 74 which is mounted upon a central shaft 75 which is rotated, at constant speed, by any conventional synchronous constant-speed motor (not shown).

Figure 3:
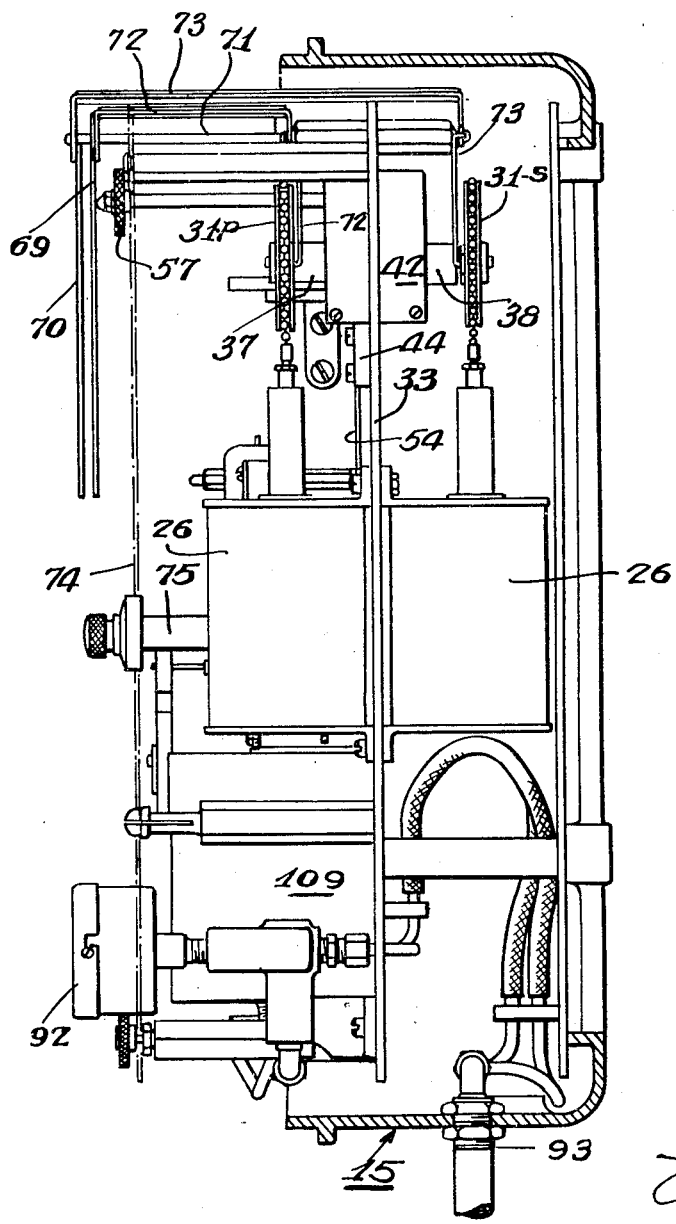
Figure 3 represents a vertical cross-sectional view generally along the line 3—3 of Figure 2.

It should be noted that the corresponding receiver coils 25 and 26 of the beams 31—p and 31—s are mounted adjacent each other as shown in Figure 3 so that the beams 31—p and 31—s tilt in the same direction upon increase in rate-of-flow in both lines 10 and 11 or upon decrease in rate-of-flow in both lines 10 and 11.

Figure 2:
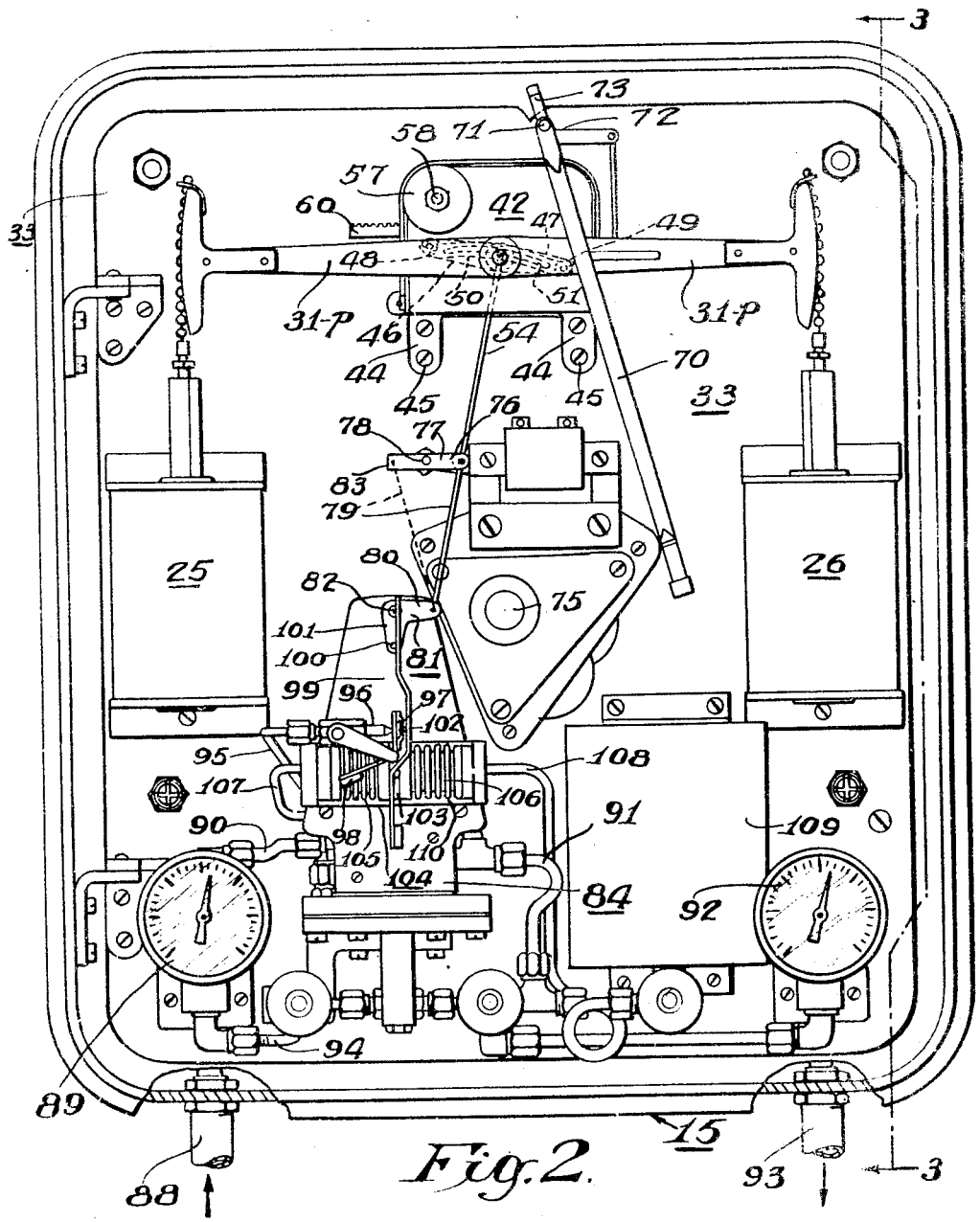
Figure 2 represents a front elevational view, on an enlarged scale, of the proportioning unit of Figure 1, shown as it appears with the front cover and the recording chart removed.

As shown particularly in Figure 2, the lower end of the connecting arm 54 is pivotally connected to one end 76 of a transfer link 77 which is centrally pivoted as at 78.

The lower connecting arm 79 extends downward from the end 76 of the transfer link 77 and pivotally connects, at its lower end, with the free end of the horizontal arm 80 of a bell-crank 81 which is pivoted as at 82.

As will be more fully described hereinbelow, the upper end of the connecting arm 79 is fastened to the right end 76 of the transfer link 77 when the motor valve 16 is of the reverse acting type (that is, when the valve opens upon admission of air under pressure thereto). When the motor valve 16 is of the direct acting type (that is, when it closes upon admission of air under pressure thereto), the upper end of the lower connecting arm 79 is shifted to connect with the left end 83 of the transfer link 79 as shown in dotted lines in Figure 2.

Rotation of the bell-crank 81 responsive to movements of the lower connecting arm 79 controls the action of an automatic air-valve 84 which is shown and described in detail in my co-pending application Serial Number 533,972, filed May 3, 1944.

Generally speaking, the operation of the air valve 84 is as follows.

Air under pressure is supplied from a line 85 and is passed through a filter 86 and an automatic pressure reducing valve 87 and is led into the unit 15 as at 88; the pressure of air so introduced being indicated upon a gauge 89.

The air under pressure is led from the gauge 89 to the air valve 84 through a line 90; the air introduced through the line 90 acting upon an upper side of a diaphragm (not shown) disposed within the valve 84.

Air under pressure leaves the upper side of the diaphragm through the line 91 within which an outlet pressure gauge 92 is connected.

The outlet air line 91 connects with a line 93 leading to the diaphragm motor valve 16 which, as stated above, is installed within the secondary line 11 and which is adapted to open or close upon application of air pressure thereto depending upon whether it is of the reverse-acting or direct-acting type.

Air under pressure is also led from the inlet air gauge 89 through the line 94 to the lower side of the diaphragm in the air valve 84.

A line 95 leads from the lower side of the diaphragm in the valve 84 to a nozzle 96 forming part of a supply-and-waste type valve. A flapper 97 is pivotally mounted adjacent said nozzle 96 and is normally urged by a counterweight 98 to a position wherein it tends to constrict said nozzle 96 and to prevent escape of air therefrom.

A generally vertical equalizer-rod 99 has its upper end bearing against a pin 100 carried by the free end of the downwardly-extending vertical arm 101 of the bell-crank 81 and is connected, as at 102 to the flapper 97. The equalizer rod 99 is pivotally mounted, below the flapper 97, upon the central block 103 of a bellows assembly 104. The bellows assembly 104 includes a left-hand proportional bellows 105 and a right-hand re-set bellows 106; the proportional bellows being connected to the upper side of the diaphragm in the valve 84 by a line 107 while the re-set bellows is connected to the upper side of said diaphragm through a line 108 within which is connected a re-set receiver 109 of large capacity.

As fully described in my co-pending application Serial Number 533,972, rotation of the bell-crank 81 will cause the flapper 97 to move toward or away from the nozzle 96 and will thereby vary the air pressure on the upper side of the diaphragm in the valve 84; the air valve 84 automatically acting to vary the air pressure transmitted through the lines 91 and 93 to actuate the motor valve 15 and thereby to regulate the rate-of-flow of fluid through the secondary line 11.

The bellows assembly 104 acts to throttle the flapper action and to return the flapper to its original position after adjustment of the rate-of-flow has been made.

The frame 110 of the bellows assembly 104 may be rotatably mounted to permit adjustment of the throttling action as fully described in my co-pending application Serial Number 533,972.

From the foregoing, it is apparent that the setting of the diaphragm motor valve 16 varies with the movement of the connecting arms 54 and 79.

As will be described hereinbelow, the position of said arms 54 and 79 is determined by the position of the proportioning link 50 which, in turn, is dependent upon the relative positions of the beams 31—p and 31—s.

Thus, the connecting arms 79 and 54 and the air valve 84 become responsive to the proportional movement of the two balanced beams 31—p and 31—s as noted by the inclination of the proportioning link 50.

That is, if, for example, the adjusting knob 57 is set to position the yoke 52 at the center of the link 50 as indicated in Figures 2, 4, 5 and 6, the ratio of fluid-flow in the primary and secondary lines 10 and 11 would be 1:1 (assuming that the capacity of the lines 10 and 11 is the same).

If it be assumed that, for the pre-selected or normal rate-of-flow, the rotameter floats are so located as to position the beams 31—p and 31—s horizontally, the bell-cranks 46 and 47 and the link 50 will also be horizontal.

Should the rate-of-flow in the primary line 10 increase or decrease from the pre-selected or normal figure, the position of the metering float in the rotameter 13 will change whereupon the balanced beam 31—p will tilt from its horizontal position. This tilting of the beam 31—p will raise or lower one end of the link 50 and will thereby tilt said link so as to raise or lower the yoke 52 and the connecting arms 54 and 79.

As described above, the movement of the arms 54 and 79 will actuate the air valve 84 so as to vary the air pressure acting upon the diaphragm motor valve 16 which will then open or close so as to increase or decrease the rate-of-flow through the secondary line 11. When this occurs, the float in the rotameter 14 will move to tilt the balanced beam 31—s; this movement and tilting continuing until the rate-of-flow through the secondary line 11 is equal to that through the primary line 10 at which time the beam 31—s will have reached the same angle of tilt as the beam 31—p. When this occurs, the other end of the link 50 will have been lowered or raised an amount equal to the raising or lowering caused by the initial tilting of the beam 31—p. That is, due to the fact that the bell-cranks 46 and 47 extend in opposite directions from their respective shafts 34 and 35, similar tilting of the beams 31—p and 31—s will cause the ends of the link 50 to be moved in opposite directions.

For example, if the original movement of the beam 31—p causes the left-hand end (in Figures 4 and 5) of the link 50 to move downward from its original position, a similar movement of the beam 31—s causes the right-hand end of the link 50 to move upward an equal distance thereby to restore the yoke 52 and the connecting arms 54 and 79 to their original position.

When this happens, the air valve 84 will be actuated to maintain the motor valve 16 at the new setting to keep the rate-of-flow through the line 11 equal to that through the line 10.

It is evident, therefore, that regardless of variations in rate-of-flow in either of the lines 10 and 11, the novel ratio controller of the present invention will operate quickly to adjust the rate-of-flow in the secondary line 11 to maintain the ratio of the two flows constant.

The ratio of proportioning can be adjusted at will be varying the position of the yoke 52 relative to the link 50 by means of the knob 57.

Figure 4:
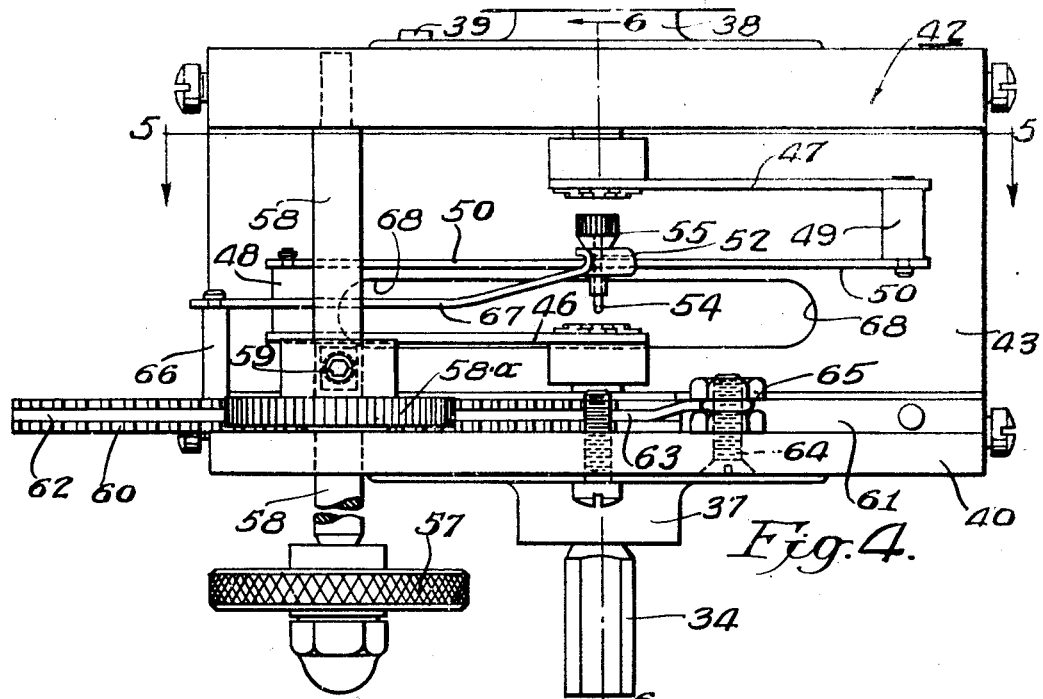
Figure 4 represents a plan view, on an enlarged scale, of the proportioning link mechanism of the embodiment of Figures 1 to 3.
Figure 5:
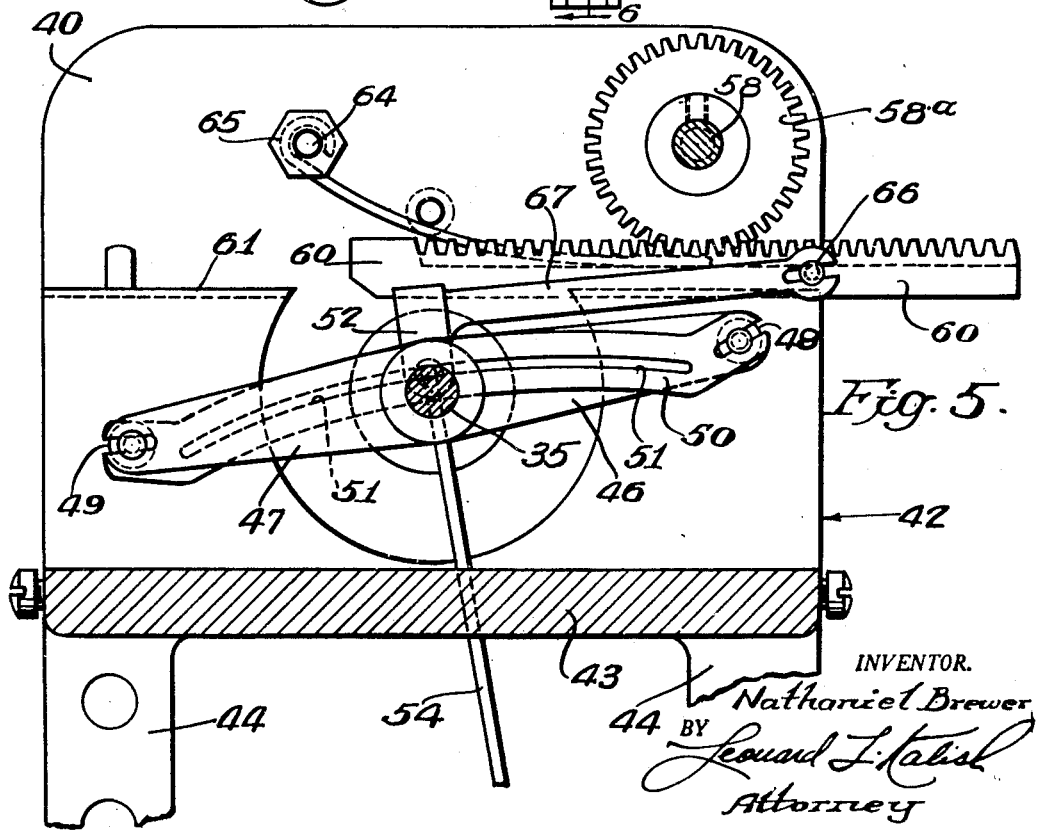
Figure 5 represents a vertical cross-sectional view generally along the line 5—5 of Figure 4.

Thus, for example, if the knob 57 is turned so as to move the yoke 52 toward the right in Figures 4 and 5, the ratio of fluid-flow in the lines 10 and 11 is increased. When the yoke 52 reaches generally the position shown in Figure 7, the ratio of flow in the lines 10 and 11 will be approximately 3:1; when the yoke 52 is moved to the right-hand end of the slot 51 in the link 50 the ratio of flow in the lines 10 and 11 will be approximately 5:1.

When, on the other hand, the knob 57 is turned in the other direction to move the yoke 52 toward the left in Figures 4 and 5 the ratio of flow in the lines 10 and 11 will decrease to 1:3 (at a position half-way between the center and the left-hand end of the slot 51) and finally to 1:5 (at the extreme left-hand end of the slot 51).

From the foregoing description, it will be obvious that, regardless of the setting of the knob 57 and the yoke 52, the novel ratio proportioner of the present invention will operate automatically to re-establish the selected ratio upon variations in flow-rate in either of the lines 10 and 11.

While I prefer to proportion the link 50 so as to limit the ratio-settings available between approximately 1:5 and 5:1 (due to mechanical difficulties in making the slot 51 coincide with the fulcrum point of the beams 31—p and 31—s), the range of ratios obtainable can, nevertheless, be increased beyond these limits simply by varying the relative sizes of the lines 10 and 11.

Thus, for example, if the capacity of the secondary line 11 were only half that of the primary line 10 (and if the rotameter 14 were changed to measure this reduced rate-of-flow), it is obvious that the 5:1 to 1:5 ratio range provided by the proportioning link 50 would result in a 10:1 to 1:2½ ratio range in actual flow-rates in the lines 10 and 11.

Again, if the capacity of the primary line 10 were ten times as great as that of the secondary line 11, the 5:1 to 1:5 ratio range provided by the link 50 would result in a 50:1 to 1:½ ratio range in actual flow-rates in the lines 10 and 11.

If desired of course, the capacity of the secondary line could be made even greater than that of the primary line to reduce the lower and upper figures of the ratio range between the flows in the two lines.

The novel ratio controller of the present invention presents several important advantages over ratio controllers heretofore employed. Thus, in one common type of ratio controlling system heretofore employed, orifice-type flow meter control instruments have been used to measure the rate-of-flow in the manually-controlled primary line by means of a flow recorder having a control mechanism equipped with a proportional bellows and adjustable throttle range, so that the air pressure output is proportional to the pen position. By changing the throttle range, the change in air-pressure per unit change in pen position could be suitably adjusted. This output air pressure was connected to another pneumatic controller additionally equipped with spring-balanced bellows motor linked to the index pointer so that the index could be moved to a chart position proportional to air-pressure; the latter pneumatic controller controlling the flow in the secondary line at this selected index point. The ratio between the pen positions of the instruments in the primary and secondary lines could be adjusted by changing the throttling range of the instrument in the primary line.

This conventional system is an awkward and expensive arrangement in that it requires two complete instruments and also requires that the instrument in the secondary line faithfully reproduce the index position proportional to air-output of the instrument in the primary line which must be truly linear with the pen position of the instrument in the primary line. This usually requires special selection of bellows in the two control instruments for matching in order successfully to accomplish the desired result.

In the novel ratio controller of the present invention, on the other hand, only a single recording and controlling unit is required and, since only one air valve 84 is employed, there is no need for selection or matching of bellows.

In addition to the mechanical advantages discussed above, the novel ratio controller of the present invention presents a distinct advantage over conventional orifice-type ratio instruments heretofore employed in that the rotameter capacity/scale curve is substantially linear and of long range (usually 10:1 or greater), whereas the orifice differential-head meter curve is non-linear; its capacity/scale curve being a square root function and its useful range being limited to approximately 3:1.

Thus, before the orifice instrument can operate satisfactorily, the square root curve must be modified to produce a linear result by some mechanical means. Even then, with the limited 3:1 range, it is obvious that suitable action as a ratio instrument is obtained only within narrow limits. For example, if the instrument in the primary line is flowing at three times the capacity of the instrument in the secondary line (the ratio-setting being 3:1), and the instrument in the primary line begins to record a rate-of-flow which is tapering off, the instrument in the secondary line being already at its lower limit of satisfactory operation, could not accurately reduce the flow in the secondary line proportionately to maintain the pre-selected ratio with the decreasing flow in the primary line.

The novel ratio controller of the present invention can be mounted in a case of more or less standard depth and, as mentioned above, the partition wall 33 can be hinged within the case to provide ready access to the beam 31—s and its associated parts. I prefer to hinge the partition wall 33 on the side opposite to the hinges of the outer door of the instrument for convenience in exposing the beam 31—s.

My novel ratio controller thus comprises a mechanically-interconnected dual instrument mounted in a single instrument case of substantially normal size and arranged to respond to a deviation of an independently variable flow-rate for a given condition, thereby to effect a linearly proportional change in another dependent flow-rate.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described my invention, I claim as new and desire to protect by Letters Patent:

1. A motion-transmitting mechanism for use in a system for controlling the ratio of flow in two fluid lines comprising a pair of movable operating elements, an actuated element, and a ratio-movement for transmitting forces of said operating elements to said actuated element, said ratio-movement comprising a pair of aligned rotatable shafts, a pair of balanced beams mounted upon said aligned shafts, a lever carried by each of said shafts, a proportioning link pivotally supported at its ends by the free ends of said levers whereby tilting of said beams causes tilting of said link, means for tilting said beams responsive to movements of said movable elements, and means for actuating said actuated element responsive to tilting of said link.

2. A motion-transmitting mechanism for use in a system for controlling the ratio of flow in two fluid lines comprising a pair of movable operating elements, an actuated element, and a ratio-movement for transmitting forces of said operating elements to said actuated element, said ratio-movement comprising a case, a pair of aligned shafts rotatably mounted within said case, a pair of balanced beams pivotally mounted upon said aligned shafts, a bell-crank carried by each of said shafts, a proportioning link pivotally supported at its ends by the free ends of said bell cranks, whereby tilting of said beams causes tilting of said link, means for tilting said beams responsive to movements of said movable elements and means for actuating said actuated element responsive to tilting of said link.

3. A motion-transmitting mechanism for use in a system for controlling the ratio of flow in two fluid lines comprising a pair of movable operating elements, an actuated element, and a ratio-movement for transmitting forces of said operating elements to said actuated element, said ratio-movement comprising a case, a pair of elongated shafts rotatably mounted within said case, a pair of balanced beams pivotally mounted back-to-back upon said elongated shafts, a pair of armatures suspended from the ends of each of said beams, a pair of impedance circuit receiver coils surrounding the armatures of each beam, said pairs of impedance receiver coils being adapted independently to tilt said beams responsive to movements of the movable operating elements, a bell crank carried by each of said shafts, a proportioning link pivotally supported at its ends by the free ends of said bell cranks, whereby tilting of said beams causes tilting of said link, and means for actuating said actuated element responsive to tilting of said link.

4. A motion-transmitting mechanism for use in a system for maintaining a generally constant ratio between independently variable conditions, comprising a pair of movable operating elements, an actuated element, and a ratio-movement for transmitting forces of said operating elements to said actuated element, said ratio-movement comprising a case, a pair of aligned shafts rotatably mounted within said case, a pair of balanced beams pivotally mounted upon said aligned shafts, a bell-crank carried by each of said shafts, a proportioning link pivotally supported at its ends by the free ends of said bell cranks, whereby tilting of said beams causes tilting of said link, means for tilting said beams responsive to movements of said movable elements and means for actuating said actuated element responsive to tilting of said link.

5. A motion-transmitting mechanism for use in a system for controlling the ratio of flow in two fluid lines comprising a pair of movable operating elements; an actuated element; and a ratio-movement for transmitting forces of said operating elements to said actuated element, said ratio-movement comprising a case, a pair of aligned shafts rotatably mounted within said case, a pair of balanced beams pivotally mounted upon said aligned shafts, a bell-crank carried by each of said shafts, a proportioning link pivotally supported at its ends by the free ends of said bell cranks, whereby tilting of said beams causes tilting of said link, means for tilting said beams responsive to movements of said movable elements; and means for actuating said actuated element responsive to tilting of said link, said actuating means comprising an elongated connecting arm pivotally fastened at one end to said link and constructed and arranged to move generally longitudinally upon tilting of said link.

6. A motion-transmitting mechanism for use in a system for controlling the ratio of flow in two fluid lines comprising a pair of movable operating elements; an actuated element; and a ratio-movement for transmitting forces of said operating elements to said actuated element, said ratio-movement comprising a case, a pair of aligned shafts rotatably mounted within said case, a pair of balanced beams pivotally mounted upon said aligned shafts, a bell-crank carried by each of said shafts, a proportioning link pivotally supported at its ends by the free ends of said bell cranks, whereby tilting of said beams causes tilting of said link, means for tilting said beams responsive to movements of said movable elements; and means for actuating said actuated element responsive to tilting of said link, said actuating means comprising an elongated connecting arm pivotally fastened at one end to said link and constructed and arranged to move generally longitudinally upon tilting of said link, and means for varying the point of attachment of said connecting arm to said link, said last-mentioned means including a yoke movably mounted upon said link and supporting the said end of said connecting arm, an adjusting rod connected to said yoke, an adjusting knob and a rack-and-pinion connection intermediate said adjusting knob and said adjusting rod for moving said yoke along said link responsive to rotation of said knob.

7. A motion-transmitting mechanism for use in a system for controlling the ratio of flow in two fluid lines comprising a pair of movable operating elements; an actuated element; and a ratio-movement for transmitting forces of said operating elements to said actuated element, said ratio-movement comprising a case, a pair of aligned shafts rotatably mounted within said case, a pair of balanced beams pivotally mounted upon said aligned shafts, a bell-crank carried by each of said shafts, a proportioning link pivotally supported at its ends by the free ends of said bell cranks, whereby tilting of said beams causes tilting of said link, means for tilting said beams responsive to movements of said movable elements, and means for actuating said actuated element responsive to tilting of said link, said actuating means comprising a yoke movably mounted upon said link, an elongated connecting arm pivotally fastened, at one end, to said yoke, and means for varying the position of said yoke upon said link thereby to vary the extent of longitudinal movement of said connecting arm resulting from tilting of said link.

NATHANIEL BREWER.

REFERENCES CITED

The following references are of record in the file of this patent:

UNITED STATES PATENTS

| Number | Name | Date |
|---|---|---|
| 2,193,095 | Harrison | Mar. 12, 1940 |
| 2,284,795 | Belaef | June 2, 1942 |
| 2,339,289 | Olken | Jan. 18, 1944 |
| 2,410,335 | Burdick | Oct. 29, 1946 |

OTHER REFERENCES

New Rotameter Types, page 296, volume II (Dec. 1938) of Instruments, published by Instruments Publishing Co., Pittsburgh, Pa.